Dec. 10, 1963  R. A. HEIMSCH ETAL  3,113,974
OXO PROCESS WITH CONTINUOUSLY INCREASING
TEMPERATURE IN A CONTINUOUS REACTOR
Filed June 19, 1959
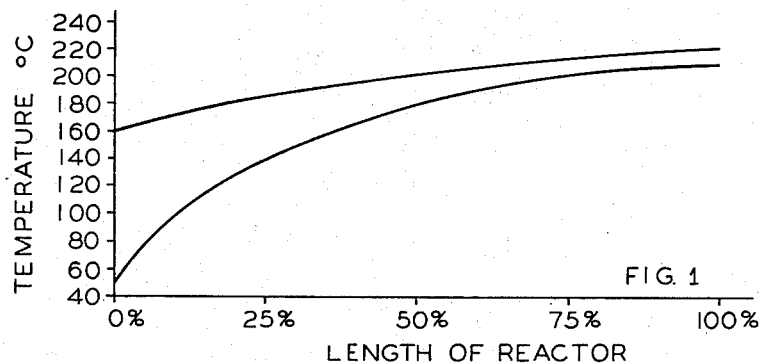
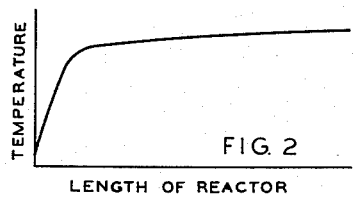
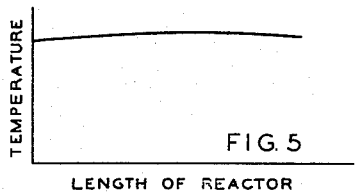
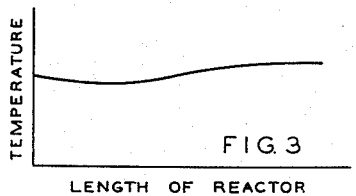
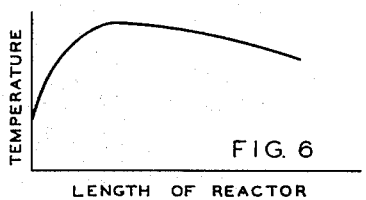
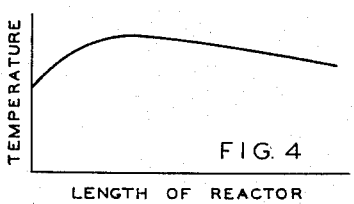
INVENTORS
ROBERT A. HEIMSCH
WILLIAM E. WEESNER
JOHN W. ANDERSEN
BY HERMAN O. BAUERMEISTER
ATTORNEY

United States Patent Office 3,113,974
Patented Dec. 10, 1963

3,113,974
OXO PROCESS WITH CONTINUOUSLY INCREASING TEMPERATURE IN A CONTINUOUS REACTOR
Robert A. Heimsch and William E. Weesner, Dayton, Ohio, and John W. Andersen, St. Louis, Mo., assignors to Monsanto Chemical Company, St. Louis, Mo., a corporation of Delaware
No Drawing. Filed June 19, 1959, Ser. No. 821,461
9 Claims. (Cl. 260—632)

The present invention relates to an improvement in the Oxo process. It is an object of the invention to provide a unitary continuous Oxo process in which the product consists predominently of alcohol.

The Oxo process as ordinarily conducted utilizes olefins which are reacted with carbon monoxide and hydrogen in the presence of a catalyst at elevated temperatures and pressures in order to produce aldehydes as the primary products. The aldehydes may then be subjected to a preliminary purification treatment before being hydrogenated to alcohols.

In the commercial operation of the Oxo process, as described above, it has been found that considerable losses are encountered in the purification of the intermediate aldehyde products and also in the hydrogenation step. It would therefore be desirable to modify the Oxo process of the prior art in order to obtain directly a high proportion of alcohol. However, if it is attempted to conduct the hydrogenation step directly upon the crude aldehyde mixture without the separation of the conventional cobalt carbonyl catalyst, it is found that the said cobalt carbonyl catalyst is decomposed by the hydrogen, thus wasting a considerable amount of this expensive catalytic component. It has also been found that the conventional direct hydrogenation (e.g. with Raney nickel catalyst) of the crude aldehyde mixture resulting from the carbonylation step results in the formation of undesirable impurities such as aldols and acetals which reduces the yield and complicates the subsequent purification.

It has now been found that the Oxo process utilizing olefins as the feed stock for reaction with carbon monoxide and hydrogen in the presence of a cobalt catalyst may be improved and controlled in such a manner as to obtain a high proportion of alcohols as the direct product without loss of catalyst components, while at the same time producing very little aldehyde in the final product.

The process of the present invention is based upon the continuous reaction of the mixture of olefins, carbon monoxide, and hydrogen in a tubular reactor with the exothermic reaction being controlled so as to provide a continuous predetermined positive temperature gradient along the tube. It is also a part of the present invention to maintain the hydrogen-carbon monoxide ratio within specific initial and terminal ranges so as to aid in directing the numerous competing reactions which take place in the overall Oxo process. It has been found as a result of detailed kinetic studies that the overall Oxo process based primarily upon the hydroformylation reaction of olefins to aldehydes, followed by hydrogenation of the aldehydes to alcohols, is in each stage, actually composed of a multiplicity of simultaneous reactions. At the same time, the olefins present in the hydroformylation step are to some degree being hydrogenated to paraffinic compounds. However, this is an undesirable result, and it is an advantage of the present invention that such loss of olefins is greatly reduced.

The primary Oxo reaction is one of hydroformylation in which an olefin is reacted with carbon monoxide and hydrogen to give aldehydes and a number of by-products. In the ordinary Oxo reaction the hydrogenation of the primary aldehydes obtained by hydroformylation is negligible or absent. It is a purpose of the present invention to provide a unitary process which controls and directs the magnitude of such primary hydroformylation to aldehydes and the subsequent hydrogenation of the same to alcohols so as to obtain a substantially complete conversion solely to alcohols. The process of the present invention therefore makes it possible to obtain a product in which the aldehyde content is 0.1% by weight or less.

The present reaction is carried out in a continuous reaction system. One type of reactor which may be employed is commonly referred to as a tubular reactor; in this device the stream of reactants moves progressively through the reactor substantially without longitudinal mixing. In another embodiment of the invention the process may be carried out in a series of autoclaves in each of which the temperature is controlled in such manner that the reaction mixture passes continuously from one autoclave to the next under the optimum temperature condition. When operating in this manner it has been found that a multiplicity of autoclaves serially arranged is equivalent in effectiveness to a continuous tubular reactor. Combinations of tubular reactor sections together with a stirred autoclave are also feasible particularly when contacting highly reactive olefins.

In the preferred embodiments of the invention no material need be added to or withdrawn from the reactor until the products are removed at the end thereof. However, it may be desirable in some circumstances to make use of a multiple inlet reactor system into which additional proportions of carbon monoxide and/or hydrogen may be added as desired during the course of the reaction.

The continuous reactor system is provided with temperature control means so as to maintain the temperature at the desired level at all points throughout the system. In this way, it is possible to conduct the present process according to the optimum temperature gradient as hereinafter more particularly described.

The present improvement in the Oxo process resulting in the direct production of a high proportion of alcohol in the initial product of the process is based primarily upon the control of the exothermic heat of reaction in such manner as to maintain a temperature profile relative to the passage of the reaction mixture through the reactor system. The drawings of the present case illustrate the critical limitation of the temperature of the reaction mixture as measured by thermocouples inserted into the reaction mixture, so related to the position of the mixture within the reactor. FIGURE 1 illustrates the maximum and minimum range within which the temperature of the reactants must be maintained relative to said position in the reactor. In general, the temperature profile along the length of the reactor makes use of an initial temperature of from 50° C. to 160° C., a mid-point temperature of 180° C. to 200° C. and a terminal temperature of from 205° C. to 220° C. Within the broad temperature ranges, there are preferred temperature ranges which are specific to certain olefin feedstocks, as set forth below:

| Olefin | Initial Range, °C. | Mid Range, °C. | Terminal Range, °C. |
|---|---|---|---|
| Propylene to produce n and i-butanols | 100–140 | 180–200 | 205–220 |
| Heptene to produce octyl alcohols | 100–150 | 180–200 | 205–220 |
| Hexene to produce mixed heptyl alcohols | 100–150 | 180–200 | 205–220 |
| Propylene trimer to produce mixed $C_{10}$ alcohols | 100–160 | 180–200 | 205–220 |
| Propylene tetramer to produce mixed $C_{13}$ alcohols | 100–160 | 180–200 | 205–220 |

In contrast to the improvement defined generally in FIGURE 1, the remaining drawings illustrate certain other temperature conditions which have been found to be undesirable in the operation of a unitary Oxo process. FIGURE 2 shows the rapid temperature rise which occurs in reactions in which there is a lack of sufficient temperature control. FIGURE 3 illustrates substantially isothermal operation at low temperatures and FIGURE 4 illustrates medium temperature operation.

FIGURE 5 is representative of isothermal operation at a high temperature. FIGURE 6 illustrates the use of a temperature gradient at relatively high temperatures.

In order to carry out the present continuous reaction and the production of high proportions of alcohols concomitant with low aldehyde production it has been found desirable to maintain certain reaction conditions within specified limits. The present method makes it possible simultaneously to direct and control the competing reactions which occur in the primary oxonation and subsequent hydrogenation in accordance with the temperature control system described herein. However, it is also desirable that other variables such as the hydrogen-carbon monoxide ratio be maintained within certain limits. The present applicants have found that the use of the herein-described temperature gradient system is particularly advantageous when using a specific $CO/H_2$ ratio, i.e., the incoming gases fed to the reactor should be less than 60% of hydrogen in the hydrogen-carbon monoxide mixture, a preferred range being from 60% to 40% volume. It has also been found that the control of the respective reactions requires that the proportion of hydrogen emerging with carbon monoxide in the exit gases shall be such that the hydrogen constitutes less than 20 volume percent of such exit carbon monoxide plus hydrogen gases, a preferred range of proportions being from 20% to 8% of hydrogen relative to the total volume of hydrogen and carbon monoxide.

In one embodiment of the present process the amount of hydrogen present at any point along the length of the tubular reactor follows a negative or declining gradient relationship. The absolute amount of hydrogen, expressed as the percentage of hydrogen in the gas phase, which is present in the present unitary process is found to be in inverse proportion with regard to the temperature-length relationship set forth above. Furthermore, it has been found that the numerical product of the said absolute values of hydrogen percentage when multiplied by the temperature (° C.) at any point along the length of the reaction, equals a number from 1500 to 10,000. For example, in operating with propylene trimer, the initial hydrogen percentage is about 40%. At the same point, the temperature is about 50° C., and the product of hydrogen percentage and temperature is 2000. At the midpoint of the reactor the hydrogen percentage is about 30 while the temperature is about 200° C. The product at this point is therefore 6000. Finally, at the exit of the reactor the hydrogen percentage is about 10 and the temperature is about 225° C. Consequently, the product of temperature and hydrogen content is 2250.

When operating with propylene, the corresponding calculations are:

|  | $H_2$ Percent | Temp. | = Product |
|---|---|---|---|
| Initial | 60% × | 120° C. = | 7,200 |
| Medium | 50% × | 180° C. = | 9,000 |
| Terminus | 10% × | 190° C. = | 1,900 |

The catalysts employed in the practice of the present invention may be any of the conventional cobalt sources, such as a cobalt carbonyl, a cobalt carboxylate, e.g., cobalt isodecanoate, a cobalt oxide, cobalt carbonate, a cobalt hydroxide, or cobalt metal. These cobalt sources are introduced into the reaction system by conventional methods and are found to be transformed into cobalt carbonyl which is generally considered to be the active carbonylation catalyst. It is an advantage of the present process that the cobalt carbonyl already present as the carbonylation catalyst is also quite effective as the hydrogenation catalyst. It has also been found that the present method avoids decobalting in the reactor vessel which might be expected in the presence of excess hydrogen. Obviously, it is undesirable to precipitate out the cobalt at the last part of the reaction zone since such cobalt would form a sludge or would "plate" out as a heavy deposit which would be difficult to remove from the reactor walls. In general, it has been found desirable to maintain the proportion of cobalt in the reaction mixture in the range of from 0.3 to 1.0 weight percent calculated as cobalt metal relative to the weight of the total feed mixture.

The pressure employed in the present oxonation is not a critical variable and may be maintained within the range of from 2000 to 10,000 pounds per square inch.

Another variable which has been found to provide a desirable form of control in the present process is the introduction of water into the reactor. The water may be added together with the olefins, hydrogen, carbon monoxide, and catalyst at the beginning of the reactor system, or more desirably may be introduced in the latter stages of the reaction in a multiple injection reactor system. It has been found that the introduction of water reduces the formation of heavy organic residues. The proportion of water employed for this purpose is less than 10% by weight referred to the weight of the total reaction mass, a preferred range being from 2 to 5% by weight of water. For example, it has been found that such introduction of about 4% by weight of water, preferably in the last half of the tubular reactor, makes it possible to increase the production of alcohol by about 5 equivalent mole percent.

The sojourn time of the reaction mixture passing through the tubular reactor may vary from 0.4 to 2 hours.

The following examples illustrate specific embodiments of the present invention.

*Example 1*

The oxonation of propylene trimer was carried out in a continuous tubular reactor 24 feet long. The reactor was divided into 4 zones each 6 feet long to provide independent temperature control regions for the maintenance of the desired temperature gradient during the course of the exothermic reaction. Propylene trimer was charged at the rate of 11.53 pounds per hour (0.91 lb. mol.) while the feed gas mixture of hydrogen and carbon monoxide ($H_2/CO$ ratio is 45:55) was charged at the rate of 0.35 lb. mol./hr. The catalyst was introduced into the system by slurrying cobaltous hydroxide with the propylene trimer so that this insoluble cobalt compound was introduced at the uniform rate of 0.227 lb./hr. In the course of the oxonation process it has been observed that the said cobalt hydroxide is rapidly transformed to cobalt carbonyl which is the effective catalytic component.

The temperature of the inlet point of the reactor was 50° C. The temperature along the reactor in relation to the sojourn time of the feed trimer is shown in FIGURE 2, based upon a total sojourn time of 0.6 hour. The specific temperatures corresponding to points along the reactor were:

| Temperature | Sojourn Time (hrs.) or | Percent of Length |
|---|---|---|
| 50° C. (or incoming feed temp.) | 0 | 0 |
| 150° C. | 0.05 | 8.3 |
| 189° C. | 0.1 | 16.7 |
| 195° C. | 0.2 | 33.3% |
| 210° C. | 0.3 | 50 |
| 216° C. | 0.4 | 66.7% |
| 213° C. | 0.5 | 83.3 |
| 222° C. | 0.6 | 100% |

The above operating conditions were found to result in the production of 76.9% isodecyl alcohol based upon the propylene trimer charged with the production of less than 0.1% isodecyl aldehyde. The reaction was carried out with the reaction mixture emerging with about 10% of the exit gas being hydrogen. It has been found that this is a desirable condition in order to achieve high alcohol production rates with the substantial conversion of essentially all of the intermediately formed aldehydes to alcohols.

The analytical data for this example, and certain other examples of the present specification are summarized in the following table.

| Example | (Run) | Analysis of Products | | | | |
|---|---|---|---|---|---|---|
| | | No-nane | No-nene | i-decyl aldehyde | i-decyl alcohol | Residue |
| 1 | 7 | 11.3 | 0 | 0.1 | 76.9 | 11.7 |
| 2 | 4 | 28.5 | 3.0 | 0.5 | 59.0 | 9.0 |
| 3 | 1 | 4.0 | 40.0 | 39.0 | 10.0 | 7.0 |
| 4 | 2 | 4.0 | 13.0 | 30.0 | 18.0 | 35.0 |
| 5 | 3 | 25.0 | 2.0 | 6.0 | 57.0 | 10.0 |
| 6 | 5 | 28.5 | 3.0 | 0.5 | 62.5 | 9.0 |

*Example 2*

In order to distinguish the controlled temperature gradient method of Example 1 from an adiabatic type of reaction, this run was carried out utilizing the apparatus and general method of Example 1, but under adiabatic conditions. It was calculated that with an inlet temperature of 50° C. the maximum temperature reached within the reaction mixture would be about 400° C. The temperature profile which results from this method of operation is shown in FIGURE 2.

*Example 3*

The method of Example 1 was conducted under substantially isothermal conditions by suitable control of the temperatures in the cooling jackets of each of the 4 zones of the reaction system. The temperature was maintained constant at 135–140° C. in each of the zones. It was found that operation under these conditions resulted in the conversion of only about 10% of the product to isodecyl alcohol although the conversion to isodecyl aldehyde amounted to 39%. Because of the above described low level of conversion the unreacted propylene trimer which emerged from the reaction amounted to 40% by weight of the original olefin. The temperature profile obtained in this run is shown in FIGURE 3.

*Example 4*

The method of Example 1 was carried out with the modification that a medium temperature isothermal reaction was conducted by suitable controls of the cooling jacket temperatures in the respective reactor zones. The temperature was thus maintained at 140–155° C. in each of the zones. It was found that operations under these conditions resulted in the conversion of 18% of the original olefin to isodecyl alcohol. The conversion to isodecyl aldehyde was far larger, corresponding to 30% conversion. However, the outstanding effect noted in this medium temperature isothermal run was the production of 35% of residue. This method of operation therefore is impractical because of low yields. The temperature profile for this run is shown in FIGURE 4.

*Example 5*

The method of Example 1 was carried out with the modification that a high temperature isothermal reaction was conducted by suitable control of the cooling jacket temperatures in the respective reaction zones. The temperature was thus maintained at 214–231° C. as the overall range with a mid-temperature being 231° C. and the terminal temperature being 224° C. The outstanding characteristic of this run as noted in the summary table above is that 25% nonane was produced by hydrogenation of the starting nonene, thus indicating a substantial loss of the olefin charged by hydrogenation to a non-reactive paraffin. The temperature profile for this run is shown in FIGURE 5.

*Example 6*

The method of Example 1 was carried out with the modification that the exothermic heat of reaction was allowed to bring the reactants very quickly to a high temperature which was then gradually reduced. Consequently, the method of operation does not represent the use of a gradually increasing temperature throughout the length of the reactor, but instead utilizes a gradually increasing temperature in only the first one-third of the reactor, while the remaining two-thirds of the reactor length are operated with a gradually decreasing temperature gradient. The temperature profile obtained in this run is shown in FIGURE 6 indicating that the initial temperature at the beginning of the reactor was 214° C. with the mid-point being 231° C. and the terminal temperature being 224° C. The analytical data obtained on the product showed that this method of operation results in excessive losses of the starting nonene since 28.5% of the product was composed of nonane.

*Example 7*

The oxonation of propylene was conducted in a two unit series of reactor vessels. The first stage of oxonation employed a stirred pot reactor with a propellor agitator, maintaining a temperature of 120° C. in this vessel. The second stage of the reactor system was a tubular vessel maintained to give a mid point of the total temperature gradient at 180° C. and an end point of 210° C.

The charge to the reactors consisted of the propylene feed containing cobalt 2-ethylhexoate as the catalyst in the proportion of 0.85 wt. percent calculated as cobalt metal. The gas feed consisted of 50 wt. percent carbon monoxide and 50 wt. percent hydrogen. In this run it was found that the product consisted primarily of n-butyl and i-butyl alcohols with the production of less than 1% aldehydes.

*Example 8*

The use of heptene as the starting olefin is shown in this example. The reaction conditions and method were similar to those of Example 1, but a heptene fraction was employed as the feedstock. The initial temperature was 120° C., the midpoint 190° C. and the end point was 210° C. The product consisted substantially entirely of iso-octyl alcohols.

*Example 9*

The production of tridecyl alcohols was carried out by charging propylene tetramer to the reaction system operated under the method of Example 1. The temperature profile obtained was similar to that of Example 1 and the products obtained were found to be predominantly tridecyl alcohols with the production of only minor quantities of tridecyl aldehydes and paraffinic hydrocarbons.

*Example 10*

A batch experiment was conducted on the oxonation of propylene tetramer. A stirred autoclave was charged with 100 grams of propylene tetrameter and a gas mixture of 40 volume percent hydrogen and 60 volume percent of carbon monoxide. The catalyst component was cobalt hydroxide which is transformed to cobalt carbonyl under oxonation reaction conditions. The reaction was initiated at about 120° C. while the entire reaction vessel with its contents was heated to provide a gradually increasing temperature up to a maximum of about 210° C. At the conclusion of the reaction, the vessel was cooled and the contents analyzed. The reaction product was found to consist predominantly of tridecyl alcohol with only minor proportions of tridecyl aldehyde being present. The gas mixture present over the liquid reaction product was also analyzed and was found to indicate only partial consumption of the hydrogen content so that the composition of the final gas mixture was about 10% of hydrogen relative to the total carbon monoxide plus hydrogen present.

*Example 11*

The method of Example 10 was repeated with the use of 10% of water in the reactants charged to the vessel. The reaction in this case was started at about 100° C. and was maintained at about 120° C. throughout the reaction. It was found that such substantially isothermal operation resulted in practically no production of alcohol and with very little conversion of the propylene tetramer, the major product being tridecyl aldehyde. It was therefore concluded that the water did not exert any beneficial effect in this experiment at low temperature.

*Example 12*

The method of Example 10 was carried out with the modification that 10% of water was charged with the liquid reactants at the beginning of the experiment. However, in this case the reaction was initiated at about 150° C. and the temperature gradient was maintained with a steady increasing temperature reaching a maximum of about 210° C. The products obtained were found to be composed largely of tridecyl alcohol with only minor proportions of tridecyl aldehyde being present. It was also found that the production of residues was decreased by the use of the water resulting in the production of increased quantities of alcohol.

What is claimed is:

1. In a process for the production of alcohols by the oxonation of olefins having from 3 to 13 carbon atoms with carbon monoxide and hydrogen in a continuous tubular reactor, employing a cobalt carbonyl catalyst with a sojourn time of from 0.4 to 2 hours, the improvement of controlling the temperature of the reaction mixture to provide a continuously increasing temperature profile along the length of the reactor with the initial temperature of the reaction mixture being from 50° C. to 160° C., the midpoint temperature of the reaction mixture being from 180° C. to 200° C., and the terminal temperature of the reaction mixture being from 205° C. to 220° C., the proportion of the said hydrogen with respect to the total volume of hydrogen plus carbon monoxide being less than 60% at the inlet and less than 20% at the outlet.

2. In a process for the production of alcohol by the oxonation of olefins having from 3 to 13 carbon atoms with carbon monoxide in a continuous reactor system, employing a cobalt carbonyl catalyst with a sojourn time of from 0.4 to 2 hours, the improvement of controlling the temperature of the reaction mixture to provide a continuously increasing temperature profile along the length of the reactor with the initial temperature of the reaction mixture being from 50° C. to 160° C. the mid point temperature of the reaction mixture being from 180° C. to 200° C., and the terminal temperature of the reaction mixture being from 205° C. to 220° C., the proportion of the said hydrogen with respect to the total volume of hydrogen plus carbon monoxide of the incoming gases to the reaction being from 60% to 40% by volume.

3. In a process for the production of alcohol by the oxonation of olefins having from 3 to 13 carbon atoms with carbon monoxide and hydrogen in a continuous tubular reactor, employing a cobalt carbonyl catalyst with a sojourn time of from 0.4 to 2 hours, the improvement of controlling the temperature of the reaction mixture to provide a continuously increasing temperature profile along the length of the reactor with the initial temperature of the reaction mixture being from 100° C. to 140° C., the mid point temperature of the reaction mixture being from 180° C. to 200° C., and the terminal temperature of the reaction mixture being from 205° C. to 220° C., the proportion of the said hydrogen with respect to the total volume of hydrogen plus carbon monoxide of the incoming gases fed to the reactor being from 60% to 40% by volume.

4. In a process for the production of alcohol by the oxonation of propylene with carbon monoxide and hydrogen in a continuous tubular reactor, employing a cobalt carbonyl catalyst with a sojourn of from 0.4 to 2 hours, the improvement of controlling the temperature of the reaction mixture to provide a continuously increasing temperature profile along the length of the reactor with the initial temperature of the reaction mixture being from 100° C. to 140° C., the mid point temperature of the reaction mixture being from 180° C. to 200° C., of the terminal temperature of the reaction mixture being from 205° C. to 220° C., the proportion of the said hydrogen with respect to the volume of hydrogen plus carbon monoxide of the incoming gases fed to the reactor being from 60% to 40% by volume.

5. In a process for the oxonation of propylene trimer with carbon monoxide and hydrogen in a continuous tubular reactor, employing a cobalt carbonyl catalyst with a sojourn time of from 0.4 to 2 hours, the improvement of controlling the temperature of the reaction mixture to provide a continuously increasing temperature profile along the length of the reactor with the initial temperature of the reaction mixture being from 100° C. to 140° C., the midpoint temperature of the reaction mixture being from 180° C. to 210° C., and the terminal temperature of the reaction mixture being from 205° C. to 220° C., the proportion of the said hydrogen with respect to the volume of hydrogen plus carbon monoxide being from 60% to 40% at the inlet and less than 20% at the outlet, and with the major product being decyl alcohols with less than 0.1% by weight of isodecyl aldehyde.

6. In a process for the oxonation of propylene with carbon monoxide and hydrogen in a continuous tubular reactor, employing a cobalt carbonyl catalyst with a sojourn time of from 0.4 to 2 hours, the improvement of controlling the temperature of the reaction mixture to provide a continuously increasing temperature profile along the length of the reactor with the initial temperature of the reaction mixture being from 100° C. to 140° C., the midpoint temperature of the reaction mixture being from 180° C. to 200° C., and the terminal temperature of the reaction mixture being from 205° C. to 220° C., the proportion of the said hydrogen with respect to the volume of hydrogen plus carbon monoxide being from 60% to 40% at the inlet and less than 20% at the outlet, and with the major product being butyl alcohols with less than 0.1% by weight of butyraldehyde.

7. In a process for the production of alcohols by the oxonation of olefins having from 3 to 13 carbon atoms with carbon monoxide and hydrogen in a continuous tubular reactor, employing a cobalt carbonyl catalyst with a sojourn time of from 0.4 to 2 hours, the improvement of introducing from 2% to 10% by weight of water into the said reactants, and also controlling the temperature of the said reaction mixture to provide a continuously increasing temperature profile along the length of the reactor in which the initial temperature of the reaction mixture is from 50° C. to 160° C., the midpoint temperature of the reaction mixture being from 180° C. to 200° C. and the terminal temperature of the reaction mixture being from 205° C. to 220° C., the proportion of the said hydrogen with respect to the volume of hydrogen plus carbon monoxide being from 60% to 40% at the inlet and less than 20% at the outlet.

8. In a process for the production of alcohols by the oxonation of propylene trimer with carbon monoxide and hydrogen in a continuous tubular reactor, employing a cobalt carbonyl catalyst with a sojourn time of from 0.4 to 2 hours, the improvement of introducing from 2% to 10% by weight of water into the said reactants, and also controlling the temperature of the said reaction mixture to provide a continuously increasing temperature profile along the length of the reactor in which the initial temperature of the reaction mixture is from 100° C. to 140° C., the midpoint temperature of the reaction mixture being from 180° C. to 200° C. and the terminal temperature of the reaction mixture being from 205° C. to 220° C., the proportion of the said hydrogen with respect to the volume of hydrogen plus carbon monoxide being from 60% to 40% at the inlet and less than 20% at the outlet.

9. In a process for the production of alcohol by the oxonation of propylene trimer with carbon monoxide and hydrogen in a continuous tubular reactor, employing a cobalt carbonyl catalyst with a sojourn time of from 0.4 to 2 hours the improvement of conducting the said reaction in the presence of from 2% to 10% by weight of water and also controlling the temperature of the reaction mixture to provide a continuously increasing temperature profile within the range shown in FIGURE 1 of the drawing, the proportion of the said hydrogen with respect to the volume of hydrogen plus carbon monoxide of the incoming gases fed to the reactor being from 60% to 40% by volume.

References Cited in the file of this patent
UNITED STATES PATENTS

| | | |
|---|---|---|
| 2,802,843 | Tramm et al. | Aug. 13, 1957 |
| 2,843,632 | Gwynn et al. | July 15, 1958 |
| 2,894,990 | Wennerberg et al. | July 14, 1959 |